US009433934B2

United States Patent
Gao et al.

(10) Patent No.: US 9,433,934 B2
(45) Date of Patent: Sep. 6, 2016

(54) IN-SITU PRODUCED Y-FAUJASITE FROM KAOLIN-DERIVED, PRE-SHAPED PARTICLES AND THE METHOD OF PREPARATION AND THE USE THEREOF

(71) Applicant: BASF Corporation, Florham Park, NJ (US)

(72) Inventors: Xingtao Gao, Holmdel, NJ (US); David Stockwell, Westfield, NJ (US); Gary M. Smith, Verona, NJ (US)

(73) Assignee: BASF Corporation, Florham Park, NJ (US)

( * ) Notice: Subject to any disclaimer, the term of this patent is extended or adjusted under 35 U.S.C. 154(b) by 617 days.

(21) Appl. No.: 13/899,816

(22) Filed: May 22, 2013

(65) Prior Publication Data

US 2013/0252802 A1  Sep. 26, 2013

Related U.S. Application Data

(63) Continuation-in-part of application No. 11/711,415, filed on Feb. 26, 2007, now Pat. No. 8,460,540.

(60) Provisional application No. 60/778,575, filed on Mar. 2, 2006.

(51) Int. Cl.
| | |
|---|---|
| *B01J 29/06* | (2006.01) |
| *B01J 29/08* | (2006.01) |
| *B01J 29/064* | (2006.01) |
| *B01J 29/10* | (2006.01) |
| *B01J 29/16* | (2006.01) |
| *C10G 45/02* | (2006.01) |
| *C10G 47/20* | (2006.01) |
| *C10G 65/12* | (2006.01) |
| *C10G 47/16* | (2006.01) |
| *B01J 35/02* | (2006.01) |
| *B01J 37/02* | (2006.01) |
| *B01J 37/00* | (2006.01) |
| *B01J 35/10* | (2006.01) |

(52) U.S. Cl.
CPC .............. *B01J 29/084* (2013.01); *B01J 29/06* (2013.01); *B01J 29/064* (2013.01); *B01J 29/106* (2013.01); *B01J 29/166* (2013.01); *C10G 45/02* (2013.01); *C10G 47/16* (2013.01); *C10G 47/20* (2013.01); *C10G 65/12* (2013.01); *B01J 35/026* (2013.01); *B01J 35/1066* (2013.01); *B01J 37/0009* (2013.01); *B01J 37/0045* (2013.01); *B01J 37/0072* (2013.01); *B01J 37/0215* (2013.01); *B01J 2229/64* (2013.01); *C10G 2400/02* (2013.01)

(58) Field of Classification Search
USPC ...................... 502/63, 64, 66, 68, 69, 74, 79
See application file for complete search history.

(56) References Cited

U.S. PATENT DOCUMENTS

| | | | |
|---|---|---|---|
| 4,493,902 A | 1/1985 | Brown et al. | |
| 4,925,546 A | 5/1990 | Kukes et al. | |
| 4,997,544 A | 3/1991 | Chou et al. | |
| 5,139,648 A | 8/1992 | Lambert | |
| 5,290,744 A | 3/1994 | Degnan, Jr. et al. | |
| 5,393,409 A | 2/1995 | Jan et al. | |
| 5,620,590 A | 4/1997 | Absil et al. | |
| 6,174,430 B1 | 1/2001 | Winquist et al. | |
| 6,656,347 B2 | 12/2003 | Stockwell et al. | |
| 6,942,784 B2 | 9/2005 | Stockwell et al. | |
| 6,943,132 B2 | 9/2005 | Stockwell et al. | |
| 8,372,772 B2 | 2/2013 | Stockwell et al. | |
| 8,398,955 B2 | 3/2013 | Lai et al. | |
| 8,460,540 B2 | 6/2013 | Stockwell et al. | |
| 2013/0157840 A1 | 6/2013 | Lai et al. | |

FOREIGN PATENT DOCUMENTS

EP   1 502 648 A1   2/2005

OTHER PUBLICATIONS

International Preliminary Report on Patentability on application No. PCT/US2007/004937 mailed on Aug. 13, 2007.
International Search Report & Written Opinion on application No. PCT/US2007/004937 mailed on Aug. 13, 2007.
Non-Final Office Action on U.S. Appl. No. 11/711,415, mailed on Oct. 16, 2008.
Final Office Action on U.S. Appl. No. 11/711,415, mailed on Mar. 6, 2009.
Non-Final Office Action on U.S. Appl. No. 11/711,415, mailed on Jan. 27, 2012.
Non-Final Office Action on U.S. Appl. No. 11/711,415, mailed on May 29, 2012.
Notice of Allowance mailed on U.S. Appl. No. 11/711,415, mailed on Dec. 18, 2012.
Non-Final Office Action on U.S. Appl. No. 12/625,641, mailed on Mar. 26, 2012.
Final Office Action on U.S. Appl. No. 12/625,641, mailed on Sep. 7, 2012.
Notice of Allowance on U.S. Appl. No. 12/625,641, mailed on Nov. 15, 2012.

*Primary Examiner* — Elizabeth Wood
(74) *Attorney, Agent, or Firm* — Lowenstein Sandler LLP

(57) ABSTRACT

A zeolite-containing fixed bed catalyst is formed by pre-shaping a mixture of a reactive aluminum-containing component and a matrix component into pre-shaped particles, and contacting the pre-shaped particles with a reactive liquid containing a silicate for a sufficient time and temperature to form an in-situ zeolite within the pre-shaped particles. The contacting of the pre-shaped particles and the liquid is achieved such that there is relative movement between the pre-shaped particles and the liquid.

18 Claims, 1 Drawing Sheet

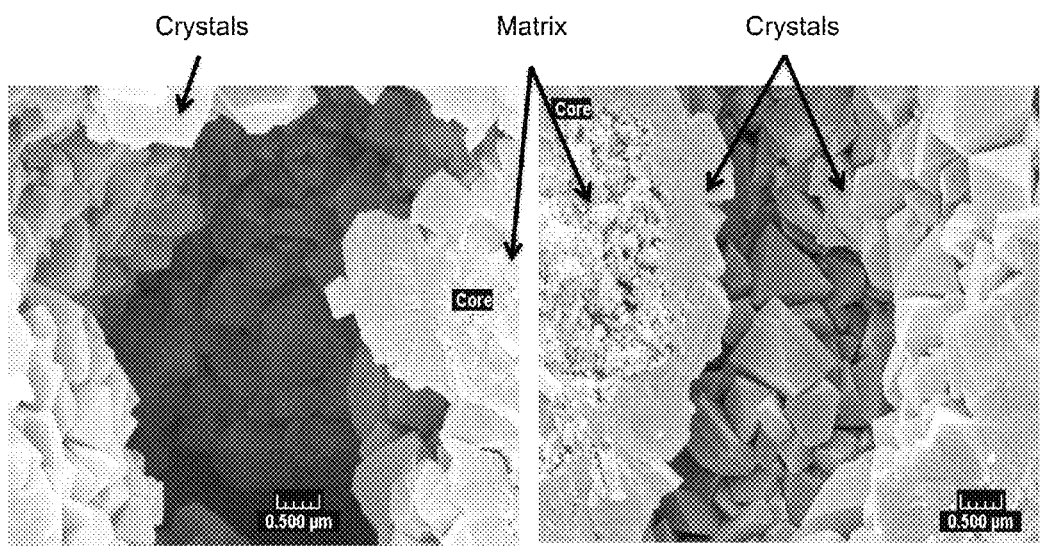
Figure 1                    Figure 2

IN-SITU PRODUCED Y-FAUJASITE FROM KAOLIN-DERIVED, PRE-SHAPED PARTICLES AND THE METHOD OF PREPARATION AND THE USE THEREOF

CROSS-REFERENCE TO RELATED APPLICATIONS

This application is a Continuation in Part of U.S. Pat. No. 8,460,540, filed Feb. 26, 2007, which claims the benefit of priority to provisional application U.S. Ser. No. 60/778,575, filed Mar. 2, 2006.

FIELD OF THE INVENTION

The invention is directed to use of an improved catalyst for the hydrocracking of hydrocarbon oils.

BACKGROUND OF THE INVENTION

Hydrocracking is a versatile petroleum refining process, which enjoys widespread and growing use in the refining industry. Hydrocracking has the ability to process a wide range of difficult feedstocks into a variety of desirable products. Feedstocks, which may be treated by this process, include heavy naphthas, kerosenes, refractory catalytically cracked cycle stocks and high boiling virgin and coker gas oils. At high severities, hydrocracking can convert these materials to gasoline and lower boiling paraffins; lesser severities permit the higher boiling feedstocks to be converted into lighter distillates such as diesel fuels and aviation kerosenes.

Hydrocracking is conventionally carried out at moderate temperatures of 350° C. to 450° C. (650° F. to 850° F.) and at high pressures, over 7,000 kPa (1,000 psig) because the thermodynamics of the hydrocracking process become unfavorable at higher temperatures. In addition, high hydrogen pressures, usually at least 800 psig are usually required to prevent catalyst aging and so to maintain sufficient activity to enable the process to be operated with a fixed bed of catalyst for periods of one to two years without the need for regeneration.

Environmental concerns, especially with sulfur oxides and nitrogen oxides emissions, have led petroleum refiners to depend more heavily than in the past on hydrodesulfurization and hydrocracking processes. Availability of by-product hydrogen from naphtha reforming no doubt has also cooperated to foster this dependence. Other factors too, have come into play to make hydroprocessing of increasing importance. Among these factors is that high quality crude oils for lube and fuels refineries are expected to progressively become more scarce. Also, refineries that include a fluid catalytic cracking (FCC) plant generate large volumes of dealkylated, aromatic refractory effluents, commonly known as FCC Cycle Oils. Decrease in demand for the fuel oil products into which these FCC Cycle Oils were previously incorporated has added to the practice of working them off by incorporation with a hydrocracker feedstock. The hydrocracking process, unlike catalytic cracking, is able to effectively upgrade these otherwise refractory materials.

Hydrocracking is an established petroleum refining process. The hydrocracking feedstock is invariably hydrotreated before being passed to the hydrocracker in order to remove sulfur and nitrogen compounds as well as metals and, in addition, to saturate olefins and to effect a partial saturation of aromatics. The sulfur, nitrogen and oxygen compounds may be removed as inorganic sulfur, nitrogen and water prior to hydrocracking although interstage separation may be omitted, as in the Unicracking-JHC process. Although the presence of large quantities of ammonia may result in a suppression of cracking activity in the subsequent hydrocracking step, this may be offset by an increase in the severity of the hydrocracking operation.

In the hydrotreater, a number of different hydrogenation reactions take place including olefin and aromatic ring saturation but the severity of the operation is limited so as to minimize cracking. The hydrotreated feed is then passed to the hydrocracker in which various cracking and hydrogenation reactions occur.

In the hydrocracker, the cracking reactions provide olefins for hydrogenation while hydrogenation in turn provides heat for cracking since the hydrogenation reactions are exothermic while the cracking reactions are endothermic; the reaction generally proceeds with generation of excessive heat because the amount of heat released by the exothermic hydrogenation reactions usually is much greater than the amount of heat consumed by the endothermic cracking reactions. This surplus of heat causes the reactor temperature to increase and accelerate the reaction rate, but control is provided by the use of hydrogen quench.

Conventional hydrocracking catalysts combine an acidic function and a hydrogenation function. The acidic function in the catalyst is provided by a porous solid carrier such as alumina, silica-alumina, or by a composite of a crystalline zeolite such as faujasite, Zeolite X, Zeolite Y or mordenite with an amorphous carrier such as silica-alumina. The use of a porous solid with a relatively large pore size in excess of 7 A is generally required because the bulky, polycyclic aromatic compounds which constitute a large portion of the typical feedstock require pore sizes of this magnitude in order to gain access to the internal pore structure of the catalyst where the bulk of the cracking reactions take place.

The hydrogenation function in the hydrocracking catalyst is provided by a transition metal or combination of metals. Noble metals of Group VIIIA of the Periodic Table, especially platinum or palladium may be used, but generally, base metals of Groups IVA, VIA and VIIIA are preferred because of their lower cost and relatively greater resistance to the effects of poisoning by contaminants. The preferred base metals for use as hydrogenation components are chromium, molybdenum, tungsten, cobalt and nickel; and, combinations of metals such as nickel-molybdenum, cobalt-molybdenum, cobalt-nickel, nickel-tungsten, cobalt-nickel-molybdenum and nickel-tungsten-titanium have been shown to be very effective and useful.

The porous support, which provides the acidic functionality in the catalyst, may comprise either an amorphous or a crystalline material or both. Amorphous materials have significant advantages for processing very high boiling feeds which contain significant quantities of bulky polycyclic materials (aromatics as well as polynaphthenes) since the amorphous materials usually possesses pores extending over a wide range of sizes and the larger pores, frequently in the size range of 100 to 400 Angstroms are large enough to provide entry of the bulky components of the feed into the interior structure of the material where the acid-catalyzed reactions may take place. Typical amorphous materials of this kind include alumina and silica-alumina and mixtures of the two, possibly modified with other inorganic oxides such as silica, magnesia or titania.

Crystalline materials, especially the large pore size zeolites such as zeolites X and Y, have been found to be useful for a number of hydrocracking applications since they have the advantage, as compared to the amorphous materials, of possessing a greater degree of activity, which enables the hydrocracking to be carried out at lower temperatures at which the accompanying hydrogenation reactions are thermodynamically favored. In addition, the crystalline catalysts tend to be more stable in operation than the amorphous materials such as alumina. The crystalline materials may, however, not be suitable for all applications since even the largest pore sizes in these materials, typically about 7.4 Angstroms in the X and Y zeolites, are too small to permit access by various bulky species in the feed. For this reason, hydrocracking of residuals fractions and high boiling feeds has generally required an amorphous catalyst of rather lower activity.

The crystalline hydrocracking catalysts generally tend to produce significant quantities of gasoline boiling range materials (approximately 330° F.-, 165° C.-) materials as product. Since hydrocracked gasolines tend to be of relatively low octane and require further treatment as by reforming before the product can be blended into the refinery gasoline pool, hydrocracking is usually not an attractive route for the production of gasoline. On the other hand, it is favorable to the production of distillate fractions, especially jet fuels, heating oils and diesel fuels since the hydrocracking process reduces the heteroatom impurities characteristically present in these fractions to the low level desirable for these products.

U.S. Pat. No. 8,372,772, issued Feb. 12, 2013, discloses a hydrocracking catalyst comprising zeolite crystallized as a layer on the surface of a porous alumina-containing matrix, the matrix being shaped by extrusion and arranged in a configuration to provide macropores in which the zeolite layer is provided on the walls of the macropores. The in-situ produced Y-fauajasite on matrix provides acidic functionality in the catalyst and is also used as a support for hydrogenating metals.

U.S. patent applications (Pub. Nos. 2004/0220046 A1 and 2004/0235642 A1) teach preparation methods for structurally enhanced zeolite microsphere FCC catalysts where zeolite crystallizes on the walls of the pores of the matrix.

As is known in the industry, the hydrocracking process is a fixed-bed process with catalysts in shaped forms of extrudates, pellets or spheres. The particle size is much larger than FCC microspheres. While the above-mentioned U.S. Pat. No. 8,372,772 discloses in-situ crystallization of pre-shaped particles, such as extrudates, the patent does not otherwise provide a specific method which provides sufficient exchange of nutrients between the liquid phase and the solid phase to provide crystallization and allows the zeolite to form on the pore walls, as well as maintain the porosity and integrity of the extrudate.

SUMMARY OF THE INVENTION

This invention is concerned with the preparation process of in-situ crystallizing zeolite as a layer on the surface of a porous matrix contained in a pre-shaped particle in a form of an extrudate, pellet or sphere. The pre-shaped particle is comprised of hydrous kaolin or metakaolin and a silica source derived from a calcined kaolin, e.g. mullite and/or spinel. The preparation process includes zeolite crystallization under sufficient exchange of nutrients between the liquid phase and the solid phase with limited or no damage to the shaped precursor particles.

The process comprises mixing the pre-shaped particles with an aqueous liquid nutrient solution such that there is relative movement between the pre-shaped particles and the liquid that contains water and nutrients for zeolite crystallization. The in-situ zeolite crystallization occurs at an elevated temperature for a period of time. Alternative processes are provided to achieve the desired relative movement between the pre-shaped particles and the liquid that contains water and nutrients for crystallization.

BRIEF DESCRIPTION OF THE FIGURES

FIG. 1 is an SEM image of the in-situ zeolite extrudates of Example 5.

FIG. 2 is an SEM image of the in-situ zeolite extrudates of Example 6.

DETAILED DESCRIPTION OF THE INVENTION

As noted above, conventional hydrocracking catalysts combine an acidic function, normally a zeolite, and a hydrogenation function.

Hydrocracking Catalyst Metal Component

The hydrogenation-dehydrogenation component is provided by a metal or combination of metals. Noble metals of Group VIIIA, especially palladium, platinum, or base metals of Groups IVA, VIA and VIIIA, especially chromium, molybdenum, tungsten, cobalt and nickel, may be used. The combination of at least one Group VIA metal such as tungsten with at least one Group VIIA metal such as nickel is particularly preferred for many applications, for example, combinations such as nickel-molybdenum, cobalt-nickel, nickel-tungsten, cobalt-nickel-molybdenum and nickel-tungsten-titanium. For certain applications palladium or platinum may be preferred.

The content of the metal component will vary according to its catalytic activity. Thus, the highly active noble metals may be used in smaller amounts than the less active base metals. For example, about 1 wt. percent or less palladium or platinum will be effective and in a preferred base metal combination, about 7 wt. % nickel and about 2 to about 21 wt % tungsten, expressed as metal. The metal component may exceed about 30 percent in a monolayer and metal contents of up to about 40% or even more may be achieved. The hydrogenation component can be exchanged onto the support materials when the metal is in the cationic form or alternatively, may be impregnated into them or physically admixed with them. Palladium or platinum compounds in which the metal is in the form of a cation of cationic complex, e.g., $Pd(NH_3)_4Cl_2$ or $Pt(NH_3)_4Cl_2$ are particularly useful for exchange of these metals onto the support. Anionic complexes such as the molybdate, vanadate and metatungstate ions may be used where the metal component is to be impregnated into the support.

Hydrocracking Catalyst Zeolite Component

The hydrocracking catalyst of this invention is provided by zeolite Y that has been formed in-situ and is formed and contained in a macroporous matrix.

The hydrocracking catalyst containing the zeolite is suitably used in a matrixed form in the catalysts and is formed into extrudates, pellets or other shapes to permit the passage of gases over the catalyst with the minimum pressure drop. The crystalline zeolite component may be matrixed or bound with active and inactive materials such as clays, silica and/or metal oxides such as alumina, titania and/or zirconia. Non-dispersible aluminas are particularly useful. The metal oxides may be either naturally occurring or in the form of gelatinous precipitates or gels including mixtures of silica and metal oxides. Suitable inactive materials serve as diluents to control the amount of conversion in a given process so that products can be obtained economically and orderly without employing other means for controlling the rate of reaction. It may be desirable to provide at least a part of the foregoing matrix materials in colloidal form so as to facilitate extrusion of the bound catalyst components(s). The relative proportions of finely divided zeolite material and matrix vary widely, with the crystal content ranging from about 1 to about 90 percent by weight and more usually, particularly when the composite is prepared in the form of beads, in the range of about 2 to about 80 weight percent of the composite.

The catalyst may be treated by conventional presulfiding treatments, e.g. by heating in the presence of hydrogen sulfide, to convert oxide forms of the metals such as CoO or NiO to their corresponding sulfides.

The hydrocracking catalyst of this invention is derived from pre-shaped particles. The zeolites are crystallized from the pre-shaped particles by the general process as disclosed in commonly assigned U.S. Pat. Nos. 6,656,347; 6,942,784 and 6,943,132, the entire contents of which are herein incorporated by reference. The pre-shaped particles used to prepare the hydrocracking catalyst are formed from a non-zeolite alumina-rich matrix, from which the zeolite is crystallized in-situ. Importantly, to provide the desired catalyst porosity, the non-zeolitic, alumina-rich matrix of the catalysts of the present invention is preferably derived from a hydrous kaolin source that is in the form of an ultrafine powder in which at least 90 wt. % of the particles are less than 2.0 microns, preferably at least 90 wt. % less than 1 micron. The ultrafine hydrous kaolin is pulverized and calcined through the exotherm. Typical zeolite microspheres for FCC cracking have been formed with an alumina-rich matrix derived from kaolin having a larger size than used in this invention and which is calcined at least substantially through its characteristic exotherm.

What is meant by "ultrafine" powder is that at least 90 wt. % of the hydrous kaolin particles must be less than 2 microns in diameter, preferably less than 1 micron determined by Sedigraph™ (or sedimentation). It has been found that, in particular, use of hydrous kaolin pigments with this particle size distribution upon pulverization and calcination through the characteristic exotherm results in a greater quantity of macroporosity, even in the catalyst subsequent to zeolite crystallization. The loose packing of the calcined ultrafine kaolin, which has been found, can be likened to a "house of cards" in which the individual particulates are aligned randomly with respect to adjacent particles in a non-parallel manner. Moreover, the calcined ultrafine kaolin exists as porous aggregates of the "house of cards" morphology, providing not only a porous aggregate but additional porous areas between aggregates. Pulverization of the ultrafine hydrous kaolin is required to provide the random stacking of the individual kaolin platelets.

Kaolin clays or pigments are naturally-occurring hydrated aluminum silicates of the approximate formula $Al_2O_3 \cdot 2SiO_2 \cdot XH_2O$, wherein X is usually 2. Kaolinite, nacrite, dickite and halloysite are species of minerals in the kaolin group. It is well-known that when kaolin is heated in air, that a first transition occurs at about 550° C. associated with an endothermic dehydroxylation reaction.

The resulting material is generally referred to as metakaolin. Metakaolin persists until the material is heated to about 975° C. and begins to undergo an exothermic reaction. This material is frequently described as kaolin, which has undergone the characteristic exothermic reaction. Some authorities refer to this material as a defect aluminum-silicon spinel or as a gamma alumina phase. See Donald W. Breck, Zeolite Molecular Sieves, published by John Wiley and Sons, 1974, pp. 314-315. On further heating to about 1,050° C., high temperature phases including mullite begin to form. The extent of conversion to mullite is dependent on a time-temperature relationship and the presence of mineralizers, as is well-known in the art.

In the preferred embodiments of this invention, the pulverized ultrafine hydrous kaolin used to derive the alumina-rich matrix is calcined through its characteristic exotherm with or without the formation of mullite. An especially preferred matrix source which is used in this invention to form the macroporous zeolite microspheres is Ansilex® 93. Ansilex® 93 is made from the fine size fraction of a hard kaolin crude, by spray drying, pulverizing and calcining to prepare low abrasion pigments as described in U.S. Pat. No. 3,586,523, to Fanselow, et al., the entire contents of which are herein incorporated by reference. The ultrafine hydrous matrix source is spray dried, pulverized and then calcined through the exotherm, optionally to mullite. While it is within the scope of the present invention to calcine the kaolin beyond the exotherm such that the X-ray diffraction intensities are comparable to a fully crystalline referenced standard, it is preferred to calcine the kaolin beyond the characteristic exotherm so as to convert the kaolin to small crystallite size mullite. The small crystallite size mullite has the appropriate diffractional lines and leached chemical composition of a fully crystalline mullite standard, but the diffractional lines are weaker inasmuch as the crystallites are smaller. The relationship between diffraction intensity/line width and crystallite size is well-known. It is preferred to calcine the kaolin beyond the exotherm to a small crystallite mullite matrix inasmuch as fully calcining the kaolin to mullite takes excessive time and temperature in practice. Furthermore, calcining kaolin beyond the exotherm to fully crystalline mullite can result in the macroporosity being lost due to sintering. Moreover, the pore volume can be decreased and the bulk density substantially increased after calcining kaolin to fully crystalline mullite. Thus, it is preferred that the ultrafine kaolin calcined through the exotherm has 20-80% of the integrated X-ray diffraction peak areas of a kaolin reference sample containing well crystallized mullite. More preferably, the ultrafine kaolin is calcined through the exotherm such that it has 50-70% of the integrated X-ray diffraction peak areas of fully crystallized mullite.

What is unusual about the use of the Ansilex® material is that it is derived from hard kaolin clay. Hard kaolin clays typically have a gray tinge or coloration and are, thus, also referred to as "gray clays". These hard kaolins are further characterized by breaking into irregularly shaped fragments having rough surfaces. Hard kaolin clays also contain a significant iron content, typically about 0.6 to 1 wt. % of $Fe_2O_3$. Hard kaolin clays are described in Grim's "Applied Clay Mineralology", 1962, MaGraw Hill Book Company, pp. 394-398 thereof, the disclosure of which is incorporated by reference herein. Hard kaolin clays have also occasionally been used as sources of metakaolin for in situ microspheres, but not with advantage.

The alumina-rich matrix can be derived from alumina-containing materials more generally characterized by the porosity thereof provided during the packing of the calcined material. A test has been developed to determine the pore volume of the calcined alumina-containing material, which ultimately forms the matrix of the inventive catalyst. The test characterizes the water pore volume of the calcined alumina-containing material by determining the minimum amount of water needed to make a slurry from a sample of the solids. In the test, a powder sample is mixed with water containing a dispersant such as, for example, Colloid 211, Viking Industries, Atlanta, Ga., in a cup using a stirring rod or spatula. Just enough water is added to the dry sample to convert the dry powder to a single mass of dilatant mud, which only just begins to flow under its own weight. The incipient slurry point (ISP) is calculated from the weights of the sample and water used. The incipient slurry point can be calculated as follows: ISP=[(grams of dry sample)/(grams of dry sample plus grams of water added)]×100. The units are dimensionless and are reported as percent solids.

This amount of water is larger than the (internal) water pore volume of the sample, but is clearly related to the water pore volume. Lower incipient slurry point percent solids values indicate higher water absorption capacities or higher pore volume in the sample. The calcined alumina-containing materials from which the high-alumina matrix is derived in accordance with this invention will have incipient slurry points less than 57% solids, preferably 48 to 52% solids. This compares with Satintone® No. 1, a conventional calcined kaolin used for making FCC microspheres, which yields over 58% solids in the incipient slurry point test.

Accordingly, not only is the ultrafine hydrous kaolin useful as an alumina-containing material from which to derive the matrix of the catalyst, but the matrix may also be derived from delaminated kaolin, platelet alumina and precipitated alumina. Means for delaminating booklets or stacks of kaolin are well-known in the art. Preferred are those methods, which use a particulate grinding medium such as sand, or glass microballoons as is well-known. Subsequent to delamination, the platelets are pulverized to derive the random packing or "house of cards" morphology.

Further sources of macroporous alumina which can be used to derive the matrix of the catalyst can include, for example, non-kaolin sources such as aluminum tri-hydrates, e.g., bayerite and gibbsite, transitional aluminas, aluminum monohydrates such as boehmite and pseudoboehmite, foamed alumina, alumina-containing aerogels, hydrotalcites, silica-alumina cogels, and bauxite.

The pulverize-calcine-pulverize processing of hydrous kaolin is preferred to make the matrix precursor of the invention because it appears that, when the foregoing is used with hydrous kaolin as the metakaolin source to form the reactive precursor pre-shaped particles, superior attrition resistance results at high pore volume.

It is also within the scope of this invention to derive the matrix from chemically synthesized spinel and/or mullite. Thus, Okata, et al., "Characterization of spinel phase from $SiO_2$—$Al_2O_3$ xerogels and the formation process of mullite", Journal of the American Ceramic Society, 69 [9] 652-656 (1986), the entire contents of which are incorporated herein by reference disclose that two kinds of xerogels can be prepared by slow and rapid hydrolysis of tetraethyoxy silane and aluminum nitrate nonahydrdate dissolved in ethanol. The slow hydrolysis method involves gelling the above mixture in an oven at 60° C. for one to two weeks whereas the rapid hydrolysis method involves adding ammonium hydroxide solution to the mixture and drying in air. Xerogels prepared by the slow hydrolysis method crystallized mullite directly from the amorphous state on firing whereas the xerogels formed by rapid hydrolysis crystallized a spinel phase before mullite formation. As is long as such calcined synthetic materials have a water pore volume within the scope of this invention, such materials can be used to derive the high-alumina matrix of the catalyst of this invention.

Further within the scope of this invention is to derive the matrix from other non-kaolin alumina sources. For example, alumina matrix precursors can include those derived from aluminum hydrates such as mono-hydrates and tri-hydrates and their derivatives. The tri-hydrates such as bayerite and gibbsite can crystallize in large particles with aspect ratios near 1. While aspect ratios close to 1 indicating a quasi-spherical morphology imply dense packing and low pore volume in aggregates, compensations such as proper pulverization and calcination can yield increased porosity in the aggregates. Precursors with aspect ratios well departed from 1 may well have the necessary macroporosity and thus reduce the need for secondary processing. The art has methods for yielding a platelet and acicular morphology, for example in gibbsite, and these morphologies are retained in the calcined products. For example, gibbsite can be calcined to alpha alumina. During the calcination process, a large internal porosity develops. This internal porosity is meta-stable and not maintained in the final alpha-alumina product, but the morphology of the original crystallite, and thus much of the macroporosity, may be retained in the final calcined products if sintering is not too severe. Bayerite and Si-stabilized bayerite have been used as bottoms upgrading aluminas. Accordingly, such bayerites, including bayerites calcined to eta alumina, after appropriate processing or synthesis can be produced with the desired macroporosity, and the use thereof as matrix materials in the present invention can yield the zeolite-on matrix morphology of the in-situ formed catalyst. Examples of bayerites used in incorporated catalysts are described in U.S. Pat. Nos. 6,165,351; 5,547,564; 5,306,417; and 5,304,526, the entire contents of which are herein incorporated by reference.

It is also known to flash calcine gibbsite, the product of which is highly reactive and can be rehydrated to high value boehmites. The preparation of flash calcined gibbsites typically first involves ball milling from 100 micron gibbsite. A low macropore volume in aggregates is implied due to the products having aspect ratios near 1 after ball milling. Incorporation of additives such as seed alumina, phosphates, or clays can yield porous boehmite agglomerates from the calcined gibbsite. U.S. Pat. Nos. 6,403,526 and 6,451,200 provide examples of such processing and are herein incorporated by reference in their entirety.

Alumina gels can be formed to contain both alumina mono-hydrates and alumina tri-hydrates. The gel systems include the alumina hydrates in a predominant solid phase in which the second phase can be water, a mixture of water and organic solvent, or air (aerogels). Depending on the method of preparation, the solid may be present as discrete particles ranging in size from a few nanometers to micrometers, or the solid can be in the form of three-dimensional polymeric networks, in which the domains of solid are linked to others via chemical bonds. Such three-dimensional polymeric networks can be macroporous and useful as matrix precursors in the catalyst of the present invention. The polymeric network, and in particular gels, can be prepared by controlled hydrolysis of aluminum alkoxides dissolved in organic solvents. Such gels have been used for the preparation of porous ceramic bodies. The properties of the gels prepared from aluminum alkoxides depend on temperature, ratio of water, the composition of the alkoxide, the type of solvent and stability thereof with water, presence of electrolytes, and the pH of the solution. All of these are factors, which influence the final product.

The aluminum hydrates are amphoteric and, thus, are soluble in strong acid and strong bases. In aqueous solutions of intermediate pH, the solubility of these materials is very low. Due to the steep slope of the solubility curve, a small change in pH can cause considerable supersaturation and consequently rapid precipitation. Accordingly, the aluminum hydrates can be precipitated in a colloidal size, which then easily coagulate to gels. Factors which determine the physical properties of the gels such as particle size, chemical composition, include temperature, rate of precipitation, final pH, ionic composition, surfactants, concentration of the starting solutions, agitation and time of aging. The rapid neutralization of aluminum salt solution with bases leads to gels rich in water, which contain variable amounts of residual acidic anions. Removal of the water and the ions may lead to macroporous components which can be useful as matrix precursors in this invention. High and low pore volume alumina monohydrates are generally known in the art. High macroporosity, at least for pseudo-boehmites, appears to be associated with processes employing precipitations from the aluminum salts. The crystallites in these materials may be fibrous. These materials are commonly employed in the extrusion of macroporous alumina supports for applications such as hydrotreating, etc. The macroporosities of these materials would be useful in the catalyst of the invention, yielding macropore structures in the ultimate catalyst. Use of milling and mulling processes for particle size and porosity control is anticipated to be an essential part and chief benefit of these specific materials. Such materials are described in U.S. Pat. Nos. 2,656,250 and 2,915,475, the entire contents of which are herein incorporated by reference.

There is an enormous amount of art describing Si—Al cogels for FCC and other applications. This art is not practiced anymore, since the products provided high pore volume, low density FCC (gel catalysts) which had comparatively poor attrition resistance. In-situ and sol-bound catalysts demonstrated much better attrition resistance, and thus, these cogels were replaced by colloidal binder technology with improved results. However, the same properties that made the prior art cogels poor for FCC render such materials excellent as in-situ precursors of the matrix and hydrocracking catalysts of this invention. Upon calcination, the alumina-rich portions of the gel are likely to form Si-free transition aluminas, Si—Al spinel or Si-modified transition aluminas, alpha alumina, and/or mullite. The silica-rich regions are likely to form high surface area amorphous silica-alumina. The former is anticipated to be functionally equivalent to a kaolin-based active matrix, and the latter to be an excellent quality nutrient for zeolite growth. Non-limiting examples of forming cogels are described in U.S. Pat. Nos. 4,310,441 and 4,499,197, the entire contents of which are herein incorporated by reference.

Large pore volume matrices can also be formed from foamed alumina and porous bauxite.

The process of hydrothermal gel aging and/or rehydration, either at ambient pressure or under autoclave or elevated pressure conditions, can be used to interconvert between the aluminum hydroxide precursor phases recited above.

In general, the catalyst of this invention, which is formed using the high water pore volume alumina-containing materials as determined by the ISP test to form the catalyst matrix, has a substantial macroporosity i.e., pores having diameters of at least 600 angstroms. While conventional zeolite-incorporated catalysts have macroporosities comparable to the catalysts of this invention, the incorporated catalysts do not have the novel zeolite-on-matrix morphology nor performance of the catalysts of this invention.

It has further been found that the macroporosity of the catalyst of this invention can be maintained even if a portion of the matrix is derived from coarse alumina-containing materials which otherwise do not meet the water pore volume desired by this invention as determined by the ISP test. Thus, it was found that blends of booklet kaolin clay and ultrafine kaolin clays that are calcined through the exotherm produce catalysts with high pore volume, wide macropores but with a lower zeolite content. Such catalysts can be valuable for exceptionally severe cracking environments.

The general procedure for manufacturing the in-situ zeolite within an alumina-containing matrix is well-known in the art and can be followed from the procedure disclosed in U.S. Pat. No. 4,493,902. As disclosed therein, an aqueous slurry of reactive aluminum-containing component, such as finely divided hydrous kaolin and/or metakaolin and alumina-containing material, which forms the matrix such as the ultrafine kaolin that has been calcined through its characteristic exotherm is prepared. In this invention, a paste or wet mixture is formed by adding the necessary amount of water to a mixture of hydrous kaolin and/or metakaolin and kaolin that has been calcined at least substantially through its characteristic exotherm to form the high-alumina matrix. The paste or wet mixture is then shaped to obtain particles in the form of extrudates, pellets or spheres. Preferably, a moderate amount of sodium silicate is added to the paste before it is shaped. During and after shaping, the sodium silicate functions as a binder between the kaolin particles.

The reactive kaolin of the paste to form the particles can be formed of hydrated kaolin or calcined hydrous kaolin (metakaolin) or mixtures thereof. The hydrous kaolin of the paste can suitably be either one or a mixture of ASP® 600 or ASP® 400 kaolin, derived from coarse white kaolin crudes. Finer particle size hydrous kaolins can also be used, including those derived from gray clay deposits, such as LHT pigment. Purified water-processed kaolin clays from Middle Georgia have been used with success. Calcined products of these hydrous kaolins can be used as the metakaolin component of the paste. Silicate for the binder is preferably provided by sodium silicates with $SiO_2$ to $Na_2O$ ratios of from 1.5 to 3.5 and especially preferred ratios of from 2.88 to 3.22.

A quantity (e.g., 3 to 30% by weight of the kaolin) of zeolite initiator may also be added to the paste before it is shaped. As used herein, the term "zeolite initiator" shall include any material containing silica and alumina that either allows a zeolite crystallization process that would not occur in the absence of the initiator or shortens significantly the zeolite crystallization process that would occur in the absence of the initiator. Such materials are also known as "zeolite seeds". The zeolite initiator may or may not exhibit detectable crystallinity by x-ray diffraction.

Adding zeolite initiator to the paste of kaolin before it is shaped into particles is referred to herein as "internal seeding". Alternatively, zeolite initiator may be mixed with the particles such as extrudate, after they are formed and before the commencement of the crystallization process, a technique which is referred to herein as "external seeding".

The zeolite initiator used in the present invention may be provided from a number of sources. For example, the zeolite initiator may comprise recycled fines produced during the crystallization process itself. Other zeolite initiators that may be used include fines produced during the crystallization process of another zeolite product or an amorphous zeolite initiator in a sodium silicate solution. As used herein, "amorphous zeolite initiator" shall mean a zeolite initiator that exhibits no detectable crystallinity by x-ray diffraction.

The seeds may be prepared as disclosed by in U.S. Pat. No. 4,493,902. Especially preferred seeds are disclosed in U.S. Pat. No. 4,631,262.

Y-faujasite is allowed to crystallize by mixing the calcined kaolin-containing shaped particles with the appropriate amounts of other constituents (including at least sodium silicate and water), as discussed in detail below, and then heating the resulting slurry to a temperature and for a time (e.g., to 70°-120° C., preferably 90-105° C. for 2 hours to 1 week, preferably, for between 6 to 24 hours) sufficient to crystallize Y-faujasite in the shaped particles. The crystallization prescriptions of U.S. Pat. No. 4,493,902 may be followed.

The sodium silicate and sodium hydroxide reactants may be added to the crystallization reactor from a variety of sources. For example, the reactants may be provided as an aqueous mixture of N® Brand sodium silicate and sodium hydroxide. As another example, at least part of the sodium silicate may be provided by the mother liquor produced during the crystallization of another zeolite-containing product.

After the crystallization process is terminated, the particles containing Y-faujasite are separated from at least a substantial portion of their mother liquor. It may be desirable to wash the particles by contacting them with water. The purpose of the washing step is to remove mother liquor that would otherwise be left entrained within the particles.

"Silica Retention" may be practiced. The teachings of U.S. Pat. No. 4,493,902 at column 12, lines 3-31, regarding silica retention are incorporated herein by cross-reference.

The particles as formed contain Y-faujasite zeolite in the sodium form. Typically, the particles contain more than about 8% by weight $Na_2O$.

Zeolite Y is normally synthesized in forms having silica:alumina ratios up to about 5:1. These as-synthesized forms of zeolite Y may be subjected to various treatments to remove structural aluminum therefrom. Many of these techniques rely upon the removal of aluminum from the structural framework of the zeolite by chemical agents appropriate to this end. A considerable amount of work on the preparation of aluminum deficient faujasites has been performed and is reviewed in Advances in Chemistry Series No. 121, Molecular Sieves, G. T. Kerr, American Chemical Society, 1973. Specific methods for preparing dealuminized zeolites are described in the following, and reference is made to them for details of the method: Catalysis by Zeolites ((International Symposium on Zeolites, Lyon, Sep. 9-11, 1980), Elsevier Scientific Publishing Co., Amsterdam, 1980 (dealuminization of zeolite Y with silicon tetrachloride); U.S. Pat. No. 3,442,795 and G.B. No. 1,058,188 (hydrolysis and removal of aluminum by chelation); G.B. No. 1,061,847 (acid extraction of aluminum); U.S. Pat. No. 3,493,519 (aluminum removal by steaming and chelation); U.S. Pat. No. 3,591,488 (aluminum removal by steaming); U.S. Pat. No. 4,273,753 (dealuminization by silicon halide and oxyhalides); U.S. Pat. No. 3,691,099 (aluminum extraction with acid); U.S. Pat. No. 4,093,560 (dealuminization by treatment with salts); U.S. Pat. No. 3,937,791 (aluminum removal with Cr(III) solutions); U.S. Pat. No. 3,506,400 (steaming followed by chelation); U.S. Pat. No. 3,640,681 (extraction of aluminum with acetylacetonate followed by dehydroxylation); U.S. Pat. No. 3,836,561 (removal of aluminum with acid); DE-OS No. 2,510,740 (treatment of zeolite with chlorine or chlorine-contrary gases at high temperatures), NL No. 7,604,264 (acid extraction), JA No. 53,101,003 (treatment with EDTA or other materials to remove aluminum) and J. Catalysis 54 295 (1978) (hydrothermal treatment followed by acid extraction).

Highly siliceous forms of zeolite Y may be prepared by steaming or by acid extraction of structural aluminum (or both) but because zeolite Y in its normal, as-synthesized condition, is unstable to acid, it must first be converted to an acid-stable form. Methods for doing this are known and one of the most common forms of acid-resistant zeolite Y is known as "Ultrastable Y" (USY); it is described in U.S. Pat. Nos. 3,293,192 and 3,402,996 and the publication, Society of Chemical Engineering (London) Monograph Molecular Sieves, page 186 (1968) by C. V. McDaniel and P. K. Maher, and reference is made to these for details of the zeolite and in preparation. In general, "ultrastable" refers to Y-type zeolite which is highly resistant to degradation of crystallinity by high temperature and steam treatment and is characterized by a $R_2O$ content (wherein R is Na, K or any other akali metal ion) of less than 4 weight percent, preferably less than 1 weight percent, and a unit cell size less than 24.5 Angstroms and a silica to alumina mole ratio in the range of 3.5 to 7 or higher. The ultrastable form of Y-type zeolite is obtained primarily by a substantial reduction of the alkali metal ions and the unit cell size. The ultrastable zeolite is identified both by the smaller unit cell and the low alkali metal content in the crystal structure.

The ultrastable form of the Y-type zeolite can be prepared by successively base exchanging a Y-type zeolite with an aqueous solution of an ammonium salt, such as ammonium nitrate, until the alkali metal content of the Y-type zeolite is reduced to less than 4 weight percent. The base exchanged zeolite is then calcined at a temperature of 540° C. to 800° C. for up to several hours, cooled and successively base exchanged with an aqueous solution of an ammonium salt until the alkali metal content is reduced to less than 1 weight percent, followed by washing and calcination again at a temperature of 540° C. to 800° C. to produce an ultrastable zeolite Y. The sequence of ion exchange and heat treatment results in the substantial reduction of the alkali metal content of the original zeolite and results in a unit cell shrinkage which is believed to lead to the ultra high stability of the resulting Y-type zeolite.

The ultrastable zeolite Y may then be extracted with acid to produce a highly siliceous form of the zeolite.

Other methods for increasing the silica:alumina ratio of zeolite Y by acid extraction are described in U.S. Pat. Nos. 4,218,307; 3,591,488 and 3,691,099 to which reference is made for details of these methods.

The preferred catalyst of the invention comprises shaped particles containing at least 10% and preferably from 20% to 65% by weight Y-faujasite, expressed on the basis of the as-crystallized sodium faujasite form of zeolite. As used herein, the term Y-faujasite shall include synthetic faujasite zeolites exhibiting, in the sodium form, an X-ray diffraction pattern of the type described in Breck, Zeolite Molecular Sieves, p. 369, Table 4.90 (1974), and having a crystalline unit cell size, in the sodium form (after washing any crystallization mother liquor from the zeolite), of less than about 24.75 A as determined by the technique described in the ASTM standard method of testing titled "Determination of the Unit Cell Size Dimension of a Faujasite Type Zeolite" (Designation D3942-80) or by an equivalent technique. The term Y-faujasite shall encompass the zeolite in its sodium form as well as in the known modified forms, including, e.g., rare earth and ammonium exchanged forms and stabilized forms. The percentage of Y-faujasite zeolite in the catalyst is determined when the zeolite is in the sodium form (after it has been washed to remove any crystallization mother liquor).

Catalyst Forming Process

The in-situ zeolite crystallization process for pre-shaped particles, such as extrudates, is similar to BASF in-situ zeolite crystallization process for FCC catalyst microspheres. Instead of spray drying the kaolin and alumina-containing slurry into microspheres, a mixture of hydrous kaolin, calcined kaolin (mullite and/or spinel), a silicate binder (e.g. N-brand) and optionally an alumina (e.g. pseudo-boehmite) is shaped into pre-shaped particles such as by extrusion to extrudates; and calcination of the as-is precursor extrudates to convert hydrous kaolin to metakaolin, and optionally pseudo-boehmite to $\gamma$-$Al_2O_3$. Typically, the particle diameter ranges from about 0.05 to 0.5 inch, with lengths ranging from about 0.05 to 1 inch.

The aqueous in-situ zeolite crystallization process uses a mixture of the calcined extrudates and liquid reagents of seeds, sodium silicate and caustic and water as discussed above. During crystallization, extrudates likely stick together due to Si leaching and insufficient solid-liquid mixing. To move the liquid against the extrudates, alternative methods are used, including (i) circulating the liquid phase with a pump so that the aqueous phase constantly moves through/around stationary extrudates; (ii) moving extrudates and liquid together using a slow rotating device, such as a rotavapor or a rotating mixer; or (iii) moving the extrudates contained in a meshed basket against the liquid phase. The first method results in no damage to the extrudates. The second method leads to some erosion on the extrudate surface but most extrudates still remain in good shape. The third method can also form in-situ zeolite crystals without any damage with sufficient movement of extrudates against the liquid phase. The crystallization occurs at elevated temperatures and time as previously discussed.

In the process using a circulating system to move the liquid phase through and/or around the pre-shaped stationary particles, the flow can be upward or a downward or horizontal flow. The flow can also be plug flow or turbulent flow type. The liquid flow is controlled at a rate from 0.1 L/min to 1000 L/min, preferably from 0.5 L/min to 50 L/min.

In the alternative process using a slow rotating device, such as a rotavapor or double cone mixer, the pre-shaped particles and the liquid that contains water and nutrients for crystallization are mixed together. The slow rotation of the container creates a gentle motion for the pre-shaped particles to move against the liquid phase. To limit the damage to the shaped particles, the rotation rate is controlled to a very slow pace, from 0.01 rpm to 10 rpm, preferably below 1 rpm. Depending on the size of the container, the tangential velocity at the point which has the longest distance to the rotation axis, is controlled at 0.1 to 100 cm/sec, preferably below 10 cm/sec. Optionally, after the first 1 to 2 hours of crystallization, the rotation may be applied occasionally, such as one rotation in one hour.

This invention describes an in-situ crystallizing process that produces zeolite as a layer on the surface of a porous matrix contained in a pre-shaped particle in a form of extrudates, pellets or spheres. The particles are at least 0.5 mm in diameter and may range in size as from about 0.5 to 5 mm. This process or method includes zeolite crystallization under sufficient exchange of nutrients between the liquid phase and the solid phase with limited or no damage to the shaped precursor particles. The zeolite extrudate obtained from this in-situ crystallization process is further processed to remove sodium through calcination and ammonium ion-exchange, as is known in the art. The finished Y-faujasite extrudate contains sodium oxide $Na_2O$ of less than 0.4 wt %. The finished Y-faujasite extrudate product possesses a unit cell size (UCS) below 24.60.

Feedstock

The present process may be used for hydrocracking a variety of feedstocks such as crude petroleum, reduced crudes, vacuum tower residua, coker gas oils, cycle oils, FCC tower bottoms, vacuum gas oils, deasphalted residua and other heavy oils. These feedstocks may optionally be subjected to a hydrotreating treatment prior to being subjected to the present hydrocracking process. The feedstock, especially in the non-hydrotreated form, will contain a substantial amount boiling above 260° C. (500° F.) and will normally have an initial boiling point of about 290° C. (about 550° F.) more usually about 340° C. (650° F.). Typical boiling ranges will be about 340° C. to 565° C. (650° F. to 1050° F.) or about 340° C. to 510° C. (650° F. to 950° F.) but oils with a narrower boiling range may, of course, also be processed, for example, those with a boiling range of about 340° C. to 455° C. (650° F. to 850° F.). Heavy gas oils are often of this kind as are cycle oils and other non-residual materials. Oils derived from coal, shale or tar sands may also be treated in this way. It is possible to co-process materials boiling below 260° C. (500° F.) but they will be substantially unconverted. Feedstocks containing lighter ends of this kind will normally have an initial boiling point above 150° C. (about 300° F.). Feedstock components boiling in the range of 290° to 340° C. (about 550° to 650° F.) can be converted to products boiling from 230° C. to 290° C. (about 450° to 550° F.) but the heavier ends of the feedstock are converted preferentially to the more volatile components and therefore the lighter ends may remain unconverted unless the process severity is increased sufficiently to convert the entire range of components. A particular hydrocarbon feedstock, which may be used, is an FCC recycle oil having an initial boiling point of at least about 343° C. (650° F.). Other examples of feedstocks include those with relatively large contents of non-aromatic hydrocarbons, such as paraffinic feedstocks, e.g., feedstocks having at least 20 percent by weight, e.g., at least 50 percent by weight, e.g., at least 60 percent by weight, of paraffins. Feedstocks, including those, which have been hydrotreated, which may be used in the present process, include those having at least 70 wt. % of hydrocarbons having a boiling point of at least 204° C. (400° F.).

Process Conditions

The feedstock is heated to an elevated temperature and is then passed over the hydrotreating and hydrocracking catalysts in the presence of hydrogen. Because the thermodynamics of hydrocracking become unfavorable at temperatures above about 450° C. (about 850° F.) temperatures above this value will not normally be used. In addition, because the hydrotreating and hydrocracking reactions are exothermic, the feedstock need not be heated to the temperature desired in the catalyst bed, which is normally in the range 290°, usually 360° C. to 440° C. (about 550°, usually 675° F. to 825° F.). At the beginning of the process cycle, the temperature employed will be at the lower end of this range but as the catalyst ages, the temperature may be increased in order to maintain the desired degree of activity.

Typically, the heavy oil feedstock is passed over the catalysts in the presence of hydrogen. The space velocity of the oil is usually in the range 0.1 to 10 LHSV, preferably 0.2 to 2.0 LHSV and the hydrogen circulation rate of from about 1400 to 5600 SCF/bbl and more usually from 300 to 800 (about 1685 to 4500 SCF/bbl). Hydrogen partial pressure is usually at least 75 percent of the total system pressure with reactor inlet pressures normally being in the range of 400 to 1500 psig (about 2860 to about 10445 kPa abs), more commonly from 800 to 1500 psig (about 5620 to 10445 kPa abs) for low to moderate pressure operation, which is the preferred mode with the present catalyst, although high pressure operation above 1500 psig (about 10445 kPa abs) is also feasible and with similar advantages, especially for fuels hydrocracking. In the high pressure mode, pressures from about 1500 to 5000 psig (about 10445 to 34575 kPa abs) are typical although higher pressures may also be utilized with the upper limit usually being set by equipment constraints. When operating at low conversions, for example, less than 50 weight percent conversion to 345° C.-(about 650° F.-) products, the pressure may be considerably lower than normal, conventional practices. We have found that total system pressures of about 700 to 1200 psig (about 4930 to 8375 kPa abs) are satisfactory, as compared to the pressures of at least 1500 psig (about 10445 kPa) normally used in commercial hydrocracking processes. Low conversion may be obtained by suitable selection of other reaction parameters, e.g., temperature, space velocity, choice of catalyst, and even lower pressures may be used. Low pressures are desirable from the point of view of equipment design since less massive and consequently cheaper equipment will be adequate. Similarly, lower pressures usually influence less aromatic saturation and thereby permit economy in the total amount of hydrogen consumed in the process.

The overall conversion may be maintained at varying levels depending on the nature of the feed and on the desired product characteristics. It is possible to operate the process at a low conversion level, less than 50 weight percent to lower boiling products, usually 340° C.-(650° F.-) products from the heavy oil feedstocks used while still maintaining satisfactory product quality. The conversion may, of course, be maintained at even lower levels, e.g. 30 or 40 percent by weight. The degree of cracking to gas ($C_4$) which occurs at these low conversion figures is correspondingly low and so is the conversion to naphtha (200° C.-, 400° F.-); the distillate selectivity of the process is accordingly high and overcracking to lighter and less desired products is minimized. It is believed that in cascade operation this effect is procured, in part, by the effect of the ammonia carried over from the first stage. Control of conversion may be affected by conventional expedients such as control of temperature, pressure, space velocity and other reaction parameters.

The feed is preferably passed over a hydrotreating catalyst before the hydrocracking catalyst in order to convert nitrogen and sulfur containing compounds to gaseous ammonia and hydrogen sulfide. At this stage, hydrocracking is minimized but partial hydrogenation of polycyclic aromatics proceeds, together with a limited degree of conversion to lower boiling (345° C.-, 650° F.-) products. The catalyst used in this stage may be a conventional denitrogenation (denitrification) catalyst. Catalysts of this type are relatively immune to poisoning by the nitrogenous and sulfurous impurities in the feedstock and, generally comprise a non-noble metal component supported on an amorphous, porous carrier such as silica, alumina, silica-alumina or silica-magnesia. Because extensive cracking is not desired in this stage of the process, the acidic functionality of the carrier may be relatively low compared to that of the subsequent hydrocracking catalyst. The metal component may be a single metal from Groups VIA and VIIIA of the Periodic Table such as nickel, cobalt, chromium, vanadium, molybdenum, tungsten, or a combination of metals such as nickel-molybdenum, cobalt-nickel-molybdenum, cobalt-molybdenum, nickel-tungsten or nickel-tungsten-titanium. Generally, the metal component will be selected for good hydrogenation activity; the catalyst as a whole will have good hydrogenation and minimal cracking characteristics. The catalyst should be pre-sulfided in the normal way in order to convert the metal component (usually impregnated into the carrier and converted to oxide) to the corresponding sulfide.

In the hydrotreating (denitrogenation) stage, the nitrogen and sulfur impurities are converted to ammonia and hydrogen sulfide. At the same time, the polycyclic aromatics are partially hydrogenated to form naphthenes and hydroaromatics which are more readily cracked in the second stage. The effluent from the first stage may be passed directly to the second or hydrocracking stage without the conventional interstage separation of ammonia or hydrogen sulfide. Hydrogen quenching may be carried out in order to control the effluent temperature and to control the catalyst temperature in the second stage. However, interstage separation of ammonia and hydrogen sulfide and light fractions may be carried out, especially with the noble metal hydrocracking catalysts, which are more sensitive to the impurities.

The relative proportions of the hydrocracking and the hydrotreating catalysts may be varied according to the feedstock in order to convert the nitrogen in the feedstock to ammonia before the charge passes to the hydrocracking step; the object is to reduce the nitrogen level of the charge to a point where the desired degree of conversion by the hydrocracking catalyst is attained with the optimum combination of space velocity and reaction temperature. The greater the amount of nitrogen in the feed, the greater then will be the proportion of hydrotreating (denitrogenation) catalyst relative to the hydrocracking catalyst. If the amount of nitrogen in the feed is low, the catalyst ratio may be as low as 10:90 (by volume, denitrogenation:hydrocracking). In general, however, ratios between 25:75 to 75:25 will be used. With many stocks an approximately equal volume ratio will be suitable, e.g. 40:60, 50:50 or 60:40.

The effluent from the denitrogenation/desulfurization stage is passed to the hydrocracking step to crack partially hydrogenated aromatics and carry out the other characteristic reactions, which take place over the hydrocracking catalyst.

The hydrocracking is carried out in the presence of a catalyst, which contains three essential components. The first component is the metal which provides the desired hydrogenation/dehydrogenation functionality and this component is supported on one or two of the porous components, namely, the macroporous catalyst support material (which may provide some of the acidic functionality of the catalyst) and the crystalline zeolite which is zeolite Y which coats or lines the walls of the macropores of the matrix.

EXAMPLES 1 AND 2

The extrudates of these examples were made by a Bonnot extruder. The weight percentages of the solid components forming the extrudates are listed in Table 1. An appropriate amount of water was added to each mixture in order to enable extrusion. These components were mixed by a mix/muller for 20-30 min before extrusion.

TABLE 1

|  | Example 1 | Example 2 |
|---|---|---|
| M93 (mullite) | 38.5% | 35.2% |
| Spinel | 0 | 20.4% |
| Hydrous kaolin | 38.5% | 44.4% |
| Silicate binder (as $SiO_2$)* | 15% | 7.4% |
| Pseudo-boehmite | 23% | 0 |

*3.22 $SiO_2/Na_2O$

The as-is extrudates of _1.5875 mm (1/16″) were calcined at 1350° F. for 2 hr before further use.

EXAMPLES 3 AND 4

The purpose of these examples is to illustrate that in-situ crystallization using a slow rotating rotavapor, provides extrudates with high pore volume. The rotation rate was ~1 rpm with a tangential velocity of ~0.5 cm/s. The reaction recipes and properties of the as-crystallized products in sodium-form are shown in Table 2.

TABLE 2

|  | Example 3 | Example 4 |
|---|---|---|
| Extrudates | Example 1 | Example 2 |
| Extrudates, parts | 100 | 100 |
| Seeds, parts | 141.9 | 65.5 |
| N-brand (silicate), parts | 73.9 | 199.9 |
| 50% caustic, parts | 15.7 | 45.8 |
| Water, parts | 98.8 | 129.6 |
| Crystallization time, hour | 6 | 9 |
| UCS, Å | 24.71 | 24.68 |
| BET, $m^2/gm$ | 403 | — |
| MSA, $m^2/gm$ | 69 | — |
| ZSA, $m^2/gm$ | 334 | — |
| Hg TPV, 40-20K, cc/gm | 0.392 | — |

The corresponding ratios of reactive components for these examples were $SiO_2/Na_2O=2.6$ w/w, $H_2O/Na_2O=7.0$ w/w, $SiO_2/Al_2O_3=7.0$ w/w.

EXAMPLES 5 AND 6

The purpose of these examples is to demonstrate that in-situ crystallization can be done on a larger scale using a slow rotating double-cone mixer. The rotation rate was ~1 rpm with a tangential velocity of ~5 cm/s. The reaction recipes and properties of the as-crystallized products in sodium-form are shown in Table 3.

TABLE 3

|  | Example 5 | Example 6 |
|---|---|---|
| Extrudates | Example 1 | Example 2 |
| Extrudates, parts | 100 | 100 |
| Seeds, parts | 150 | 69.2 |
| N-brand (silicate), parts | 65.4 | 196 |
| 50% caustic, parts | 14.5 | 50.1 |
| Water, parts | 100 | 140 |
| Crystallization time, hour | 8 | 8 |
| UCS, Å | 24.775 | 24.748 |
| BET, $m^2/gm$ | 515 | 439 |
| MSA, $m^2/gm$ | 62 | 62 |
| ZSA, $m^2/gm$ | 453 | 376 |
| Hg TPV, 40-20K, cc/gm | 0.145 | 0.164 |

The corresponding ratios of reactive components for Example 5 were $SiO_2/Na_2O=2.6$ w/w, $H_2O/Na_2O=6.9$ w/w, $SiO_2/Al_2O_3=6.9$ w/w, and for Example 6 were $SiO_2/Na_2O=2.5$ w/w, $H_2O/Na_2O=7.0$ w/w, $SiO_2/Al_2O_3=7.0$ w/w.

The as-crysatallized zeolite extrudates were analyzed for backscatter electron image (BEI) and secondary electron image (SEI) by a JEOL 6500 Schottky thermal field emission scanning electron microscope (FE-SEM). The SEM images of the cut extrudate cores demonstrate the general porosity and the morphology of zeolite-on-matrix structure. FIGS. 1 and 2 illustrate the SEM images of the catalyst extrudates of Example 5 and 6, respectively.

EXAMPLES 7 AND 8

These examples disclose the preparation of in-situ zeolite extrudates by using a circulating unit where the liquid reagents are continuously circulated through a fixed bed of extrudates by a liquid pump. The liquid flow rate was controlled at ~1 L/min. This method moves the aqueous phase without moving the extrudates, preventing any damage to the extrudates. The reaction recipes and crystallization time are the same as Examples 5 and 6. The properties of the as-crystallized products in sodium-form are shown in Table 4.

TABLE 4

|  | Example 5 | Example 6 |
|---|---|---|
| Extrudates | Example 1 | Example 2 |
| Crystallization Recipe | | |
| Extrudates, parts | 100 | 100 |
| Seeds, parts | 150 | 69.2 |
| N-brand (silicate), parts | 65.4 | 196 |
| 50% caustic, parts | 14.5 | 50.1 |
| Water, parts | 100 | 140 |
| Crystallization time, hour | 8 | 8 |
| Sodium-form properties | | |
| UCS, Å | 24.73 | 24.66 |
| BET, $m^2/gm$ | 476 | 365 |
| MSA, $m^2/gm$ | 57 | 52 |
| ZSA, $m^2/gm$ | 419 | 313 |

The sodium-form extrudates were further ion-exchanged with 30 wt % ammonium nitrate solution at 180° F. for 1 hr while the pH was controlled by 34 wt % $HNO_3$ at 3.0-3.5. The weight ratio of the extrudates to ammonium nitrate solution was 1:2. After filtration and washing with hot water, two more such exchanges were performed on the extrudates. Then, the partially exchanged extrudates were dried and calcined at 1150° F. for 2 hrs at a 25% moisture level. Subsequently, the ammonium exchange procedure was repeated for three times. The final calcination was done at 1250° F. for 2 hr at a 25% moisture level. The results of the finished products are listed in Table 5.

TABLE 5

|  | Example 5 | Example 6 |
|---|---|---|
| Properties of finished products | | |
| UCS, Å | 24.46 | 24.42 |
| BET, $m^2/gm$ | 276 | 242 |
| MSA, $m^2/gm$ | 166 | 157 |
| ZSA, $m^2/gm$ | 110 | 84 |
| Hg TPV, 40-20K, cc/gm | 0.203 | 0.214 |
| $Al_2O_3$, wt % | 42.1 | 42.9 |
| $SiO_2$, wt % | 56.0 | 53.9 |
| $Na_2O$, wt % | 0.3 | 0.3 |
| $Fe_2O_3$, wt % | 0.5 | 0.8 |
| $TiO_2$, wt % | 1.1 | 1.7 |
| $P_2O_5$, wt % | 0.05 | 0.06 |

EXAMPLE 9

This example discloses the preparation of in-situ zeolite extrudates by using a moving mesh busket that contained 1/16" extrudates after calcination at 1350° F. for two hours. This method moves the extrudates without moving the aqueous phase. Extrudates were prepared using formulation similar to above examples. The extrudates were loaded into a stainless steel mesh basket that was immersed into a reactor containing the liquid reagents required to grow the desired amount of zeolite Y. The basket, attached to a stainless steel shaft, was constructed to fit inside the reactor and spin freely using a variable speed mixer. The movement of the mesh basket provides better contact between the extrudates and the mother liquor to improve the crystallization effectiveness. The basket revolved at a rate of 40-120 rpm. The best results were achieved at faster agitation speeds.

The extrudates were crystallized in 20 hours with 57% zeolite. TSA was 428 m2/g and ZSA 379 m2/g. The corresponding ratios of reactive components were $SiO_2/Na_2O=2.6$ w/w, $H_2O/Na_2O=8.0$ w/w, $SiO_2/Al_2O_3=7.0$ w/w.

The invention claimed is:

1. A process for preparing a zeolite-containing fixed bed catalyst, the process comprising:
   shaping a first mixture of a reactive aluminum-containing component and one or more matrix-forming components into pre-shaped particles having a size suitable for fixed bed catalysis, wherein said shaping comprises extrusion; and
   contacting said pre-shaped particles with a liquid containing a reactive silicate component for a time and a temperature sufficient to crystallize zeolite Y on said pre-shaped particles, wherein said contacting comprises providing velocity of at least one of said pre-shaped particles relative to said liquid or said liquid relative to said pre-shaped particles.

2. The process of claim 1, wherein said reactive aluminum-containing component is metakaolin.

3. The process of claim 2, wherein said pre-shaped particles comprise hydrous kaolin, and said pre-shaped particles are calcined so as to convert said hydrous kaolin to metakaolin.

4. The process of claim 1, wherein said one or more matrix-forming components comprise at least one of kaolin calcined through exotherm of the kaolin to spinel, mullite, or alumina.

5. The process of claim 1, wherein said liquid is contacted with said pre-shaped particles by circulating said liquid through a stationary bed of said pre-shaped particles.

6. The process of claim 1, wherein said liquid is contacted with said pre-shaped particles by forming a second mixture of said pre-shaped particles in said liquid, and providing movement to said second mixture.

7. The process of claim 1, wherein said liquid is contacted with said pre-shaped particles by providing said pre-shaped particles in a porous container, and moving said porous container within said liquid.

8. The process of claim 7, wherein said porous container is a basket and said basket is rotated within said liquid.

9. The process of claim 1, wherein said pre-shaped particles have a diameter of from about 0.05 to 0.5 inch, and a length of from about 0.05 to 1 inch.

10. The process of claim 1, wherein said pre-shaped particles have a diameter of about 1/16th inch.

11. The process of claim 1, wherein said one or more matrix-forming components are such to provide macropores within said pre-shaped particles, and wherein said zeolite Y is crystallized as a layer on walls of said macropores.

12. The process of claim 1, wherein said catalyst comprises, subsequent to crystallization of said zeolite Y, at least 10 to 65 percent by weight of said zeolite Y.

13. The process of claim 1, wherein said liquid comprises an aqueous solution of sodium silicate and sodium hydroxide.

14. The process of claim 13, wherein said liquid further includes zeolite seeds.

15. The process of claim 1, wherein said temperature sufficient to crystallize said zeolite Y on said pre-shaped particles is 70-120° Celsius, and said time sufficient to crystallize said zeolite Y on said pre-shaped particles is from 2 hours to 1 week.

16. The process of claim 1, wherein said zeolite-containing fixed bed catalyst is treated to remove sodium ions from said crystallized zeolite Y.

17. The process of claim 15, wherein said reactive aluminum-containing component is metakaolin.

18. The process of claim 17, wherein said one or more matrix-forming components comprise at least one of kaolin calcined through exotherm of the kaolin to spinel, mullite, or alumina.

* * * * *